(12) United States Patent
Ito et al.

(10) Patent No.: US 12,365,328 B2
(45) Date of Patent: Jul. 22, 2025

(54) CONTROL DEVICE OF VEHICLE

(71) Applicant: TOYOTA JIDOSHA KABUSHIKI KAISHA, Toyota (JP)

(72) Inventors: Hisashi Ito, Obu (JP); Koki Minamikawa, Nagoya (JP); Akihito Hayasaka, Nisshin (JP); Shotaro Yamada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 334 days.

(21) Appl. No.: 18/106,021

(22) Filed: Feb. 6, 2023

(65) Prior Publication Data

US 2023/0249667 A1    Aug. 10, 2023

(30) Foreign Application Priority Data

Feb. 9, 2022 (JP) ................. 2022-019109

(51) Int. Cl.
*B60W 20/15* (2016.01)
*B60W 10/08* (2006.01)
*B60W 10/26* (2006.01)

(52) U.S. Cl.
CPC ............ *B60W 20/15* (2016.01); *B60W 10/08* (2013.01); *B60W 10/26* (2013.01); *B60W 2710/083* (2013.01); *B60W 2710/086* (2013.01)

(58) Field of Classification Search
None
See application file for complete search history.

(56) References Cited

U.S. PATENT DOCUMENTS

| | | | |
|---|---|---|---|
| 2015/0291175 A1* | 10/2015 | Harada | B60W 10/08 180/65.265 |
| 2016/0144849 A1* | 5/2016 | Minamikawa | B60W 10/06 180/65.265 |

FOREIGN PATENT DOCUMENTS

| | | | | |
|---|---|---|---|---|
| JP | 2009-248913 A | 10/2009 | | |
| JP | 2010-195312 A | 9/2010 | | |
| JP | 2013071662 A | * 4/2013 | | B60L 11/14 |
| JP | 2015-009635 A | 1/2015 | | |

* cited by examiner

*Primary Examiner* — Navid Z. Mehdizadeh
*Assistant Examiner* — Jason R Roberson
(74) *Attorney, Agent, or Firm* — Dinsmore & Shohl LLP

(57) ABSTRACT

A control device of a vehicle, the vehicle having: a power source including an engine and an electric motor; and a power transmission shaft to which the power source is coupled in a power transmittable manner; the vehicle comprising: a power transmission device transmitting a torque of the power source input to the power transmission shaft, to driving wheels; and an electric-power accumulator supplying/receiving electric power to/from the electric motor, the control device comprising: a power source control unit performing charge control for increasing a torque of the engine that achieves a drive demand amount during running of the vehicle in a driving state; and a charge limit control unit performing charge limit control for limiting a charging power in the charge control.

8 Claims, 5 Drawing Sheets

CONTROL DEVICE OF VEHICLE

CROSS-REFERENCE TO RELATED APPLICATIONS

This application claims priority from Japanese Patent Application No. 2022-019109 filed on Feb. 9, 2022, the disclosure of which is herein incorporated by reference in its entirety.

BACKGROUND

Technical Field

The present disclosure relates to a control device of a vehicle equipped with a power transmission device transmitting a torque of a power source including an engine and an electric motor, to driving wheels.

Description of the Related Art

A control device of a vehicle has been well known that has: a power source including an engine and an electric motor; and a power transmission shaft to which the power source is coupled in a power transmittable manner; and that includes: a power transmission device transmitting a torque of the power source input to the power transmission shaft, to driving wheels; and an electric-power accumulator supplying/receiving electric power to/from the electric motor. For example, a control device of a hybrid vehicle described in JP2015-9635A corresponds thereto. JP2015-9635A discloses: that the power transmission device is equipped with an automatic transmission; that the electric power accumulator is charged using power of the engine within a range defined by a charge limit value for a demanded value of charging power to be charged into the electric power accumulator; that when the gear ratio of the automatic transmission is a high-vehicle-velocity-side gear ratio, the charge limit value is set to a smaller value as compared with when it is a low-vehicle-velocity-side gear ratio; and that it is thereby possible to properly keep the remaining charge of the electric power accumulator while suppressing vibrations and noises which occur during running.

In the case of performing the charge control for charging the electric power accumulator during running of the vehicle in the driving state, the engine torque needs to be increased by the charging power for the engine torque achieving the drive demand amount. On the other hand, the higher the engine torque is, the poorer the estimation accuracy of the engine torque becomes, whereupon difference between the actual value and the estimated value tends to increase. This makes it difficult to control the actual value of the engine torque to a target value when controlling the torque of the electric motor based on the estimated value of the engine torque for example, which may easily cause shock.

SUMMARY

The present disclosure was conceived in view of the above circumstances, and an object thereof is to provide a control device of a vehicle, capable of properly keeping the remaining charge of the electric power accumulator while suppressing the occurrence of shock when performing the charge control during running.

The object indicated above is achieved according to the following aspects of the present disclosure.

According to a first aspect of the disclosure, there is provided a control device of a vehicle, the vehicle having (a) a power source including an engine and an electric motor; and a power transmission shaft to which the power source is coupled in a power transmittable manner; the vehicle comprising: a power transmission device transmitting a torque of the power source input to the power transmission shaft, to driving wheels; and an electric-power accumulator supplying/receiving electric power to/from the electric motor, the control device comprising
(b) a power source control unit performing charge control for increasing a torque of the engine that achieves a drive demand amount so as to achieve a demanded value of a charging power to be charged into the electric-power accumulator by power generation of the electric motor during running of the vehicle in a driving state; and (c) a charge limit control unit performing charge limit control for limiting the charging power in the charge control when the power transmission shaft has a rotation number equal to or less than a fixed rotation number and when a power transmission shaft torque is equal to or less than a fixed torque, the power transmission shaft torque being a torque on the power transmission shaft transmitted to the driving wheels, of the torque of the power source, the charge limit control unit not performing the charge limit control when the power transmission shaft has a rotation number exceeding the fixed rotation number or when the power transmission shaft torque exceeds the fixed torque.

According to a second aspect of the disclosure, in the control device of a vehicle according to the first aspect of the disclosure, the charge limit control unit performs the charge limit control when the vehicle has a vehicle velocity equal to or less than a fixed vehicle velocity, the charge limit control unit not performing the charge limit control when the vehicle velocity exceeds the fixed vehicle velocity.

According to a third aspect of the disclosure, in the control device of a vehicle according to the second aspect of the disclosure, when the charge limit control unit performs the charge limit control, the charge limit control unit sets at least one of the fixed rotation number and the fixed torque to a higher value according as the vehicle velocity is lower.

According to a fourth aspect of the disclosure, in the control device of a vehicle according to the second or the third aspect of the disclosure, when the charge limit control unit performs the charge limit control, the charge limit control unit sets an upper limit value of the charging power upon limiting the charging power, to a smaller value according as the vehicle velocity is lower.

According to a fifth aspect of the disclosure, in the control device of a vehicle according to any one of the first through fourth aspect of the disclosure, the charge limit control unit performs the charge limit control when an automatic transmission disposed in the power transmission device has a gear ratio equal to a predetermined low-vehicle-velocity-side gear ratio, the charge limit control unit not performing the charge limit control when the gear ratio is on higher vehicle-velocity side than the predetermined low-vehicle-velocity-side gear ratio.

According to a sixth aspect of the disclosure, in the control device of a vehicle according to the fifth aspect of the disclosure, when the charge limit control unit performs the charge limit control, the charge limit control unit sets at least one of the fixed rotation number and the fixed torque to a higher value according as the gear ratio is on lower vehicle-velocity side.

According to a seventh aspect of the disclosure, in the control device of a vehicle according to the fifth or the sixth aspect of the disclosure, when the charge limit control unit performs the charge limit control, the charge limit control unit sets an upper limit value of the charging power upon limiting the charging power, to a smaller value according as the gear ratio is on lower vehicle-velocity side.

According to an eighth aspect of the disclosure, in the control device of a vehicle according to any one of the first through seventh aspect of the disclosure, when the charge limit control unit performs the charge limit control, the charge limit control unit sets an upper limit value of the charging power upon limiting the charging power, to a smaller value according as the power transmission shaft has a lower rotation number.

According to a ninth aspect of the disclosure, in the control device of a vehicle according to any one of the first through eighth aspect of the disclosure, when the charge limit control unit performs the charge limit control, the charge limit control unit sets an upper limit value of the charging power upon limiting the charging power, to a smaller value according as the power transmission shaft torque is lower.

Effect

According to the first aspect of the disclosure, the charge limit control is performed if the system shaft rotation number is equal to or less than the fixed rotation number and if the system shaft torque is equal to or less than the fixed torque, whereas the charge limit control is not performed if the system shaft rotation number exceeds the fixed rotation number or if the system shaft torque exceeds the fixed torque, with the result that increase of the engine torque in response to the demanded charging power is suppressed and influence of variations in the engine torque on the system shaft torque is suppressed. Thus, at the time of performing the charge control during running, it is possible to properly keep the remaining battery charge SOC while suppressing occurrence of shock.

According to the second aspect of the disclosure, the charge limit control is performed if the vehicle velocity is equal to or less than the fixed vehicle velocity, whereas the charge limit control is not performed if the vehicle velocity exceeds the fixed vehicle velocity, with the result that occurrence of shock is suppressed due to execution of the charge limit control in the low vehicle velocity range having high shock sensitivity.

According to the third aspect of the disclosure, in the case of performing the charge limit control, at least one of the fixed rotation number and the fixed torque is set to a higher value according as the vehicle velocity V is lower, facilitating execution of the charge limit control according as going to lower vehicle velocity side having higher shock sensitivity.

According to the fourth aspect of the disclosure, in the case of performing the charge limit control, the upper-limit charging power is set to a smaller value according as the vehicle velocity is lower, thereby more suppressing increase in the engine torque and influence of variations in the engine torque according as going to lower vehicle velocity side having higher shock sensitivity.

According to the fifth aspect of the disclosure, the charge limit control is performed if the gear ratio of the automatic transmission is the fixed low-side gear ratio, whereas the charge limit control is not performed if the gear ratio is on higher side than the fixed low-side gear ratio, thereby suppressing occurrence of shock through execution of the charge limit control at the low-side gear ratio having high shock sensitivity.

According to the sixth aspect of the disclosure, in the case of performing the charge limit control, at least one of the fixed rotation number and the fixed torque is set to a higher value according as the gear ratio is on lower side, facilitating execution of the charge limit control according as going to a lower-side gear ratio having higher shock sensitivity.

According to the seventh aspect of the disclosure, in the case of performing the charge limit control, the upper-limit charging power is set to a smaller value according as the gear ratio of the automatic transmission is on lower side, thereby more suppressing increase in the engine torque and influence of variations in the engine torque according as going to a lower-side gear ratio having higher shock sensitivity.

According to the eighth aspect of the disclosure, in the case of performing the charge limit control, the upper-limit charging power is set to a smaller value according as the system shaft rotation number is lower, thereby more suppressing increase in the engine torque according as going to a lower system shaft rotation number that allows easier increase in the engine torque.

According to the ninth aspect of the disclosure, in the case of performing the charge limit control, the upper-limit charging power is set to a smaller value according as the system shaft torque is lower, thereby more suppressing influence of variations in the engine torque according as going to a lower system shaft torque that allows influence of variations in the engine torque more easily.

DESCRIPTION OF THE EMBODIMENT

In an embodiment of the present disclosure, the automatic transmission gear ratio is "input rotary member rotation number/output rotary member rotation number". The high-side gear ratio of the automatic transmission is a high-vehicle-velocity-side gear ratio with a smaller gear ratio. The low-side gear ratio of the automatic transmission is a low-vehicle-velocity-side gear ratio with a larger gear ratio.

For example, the lowest gear ratio is a lowest-vehicle-velocity-side gear ratio with a lowest vehicle velocity and a maximum gear ratio with a largest gear ratio.

The embodiment of the present disclosure will hereinafter be described in detail with reference to the drawings.

Embodiment

Figure 1:
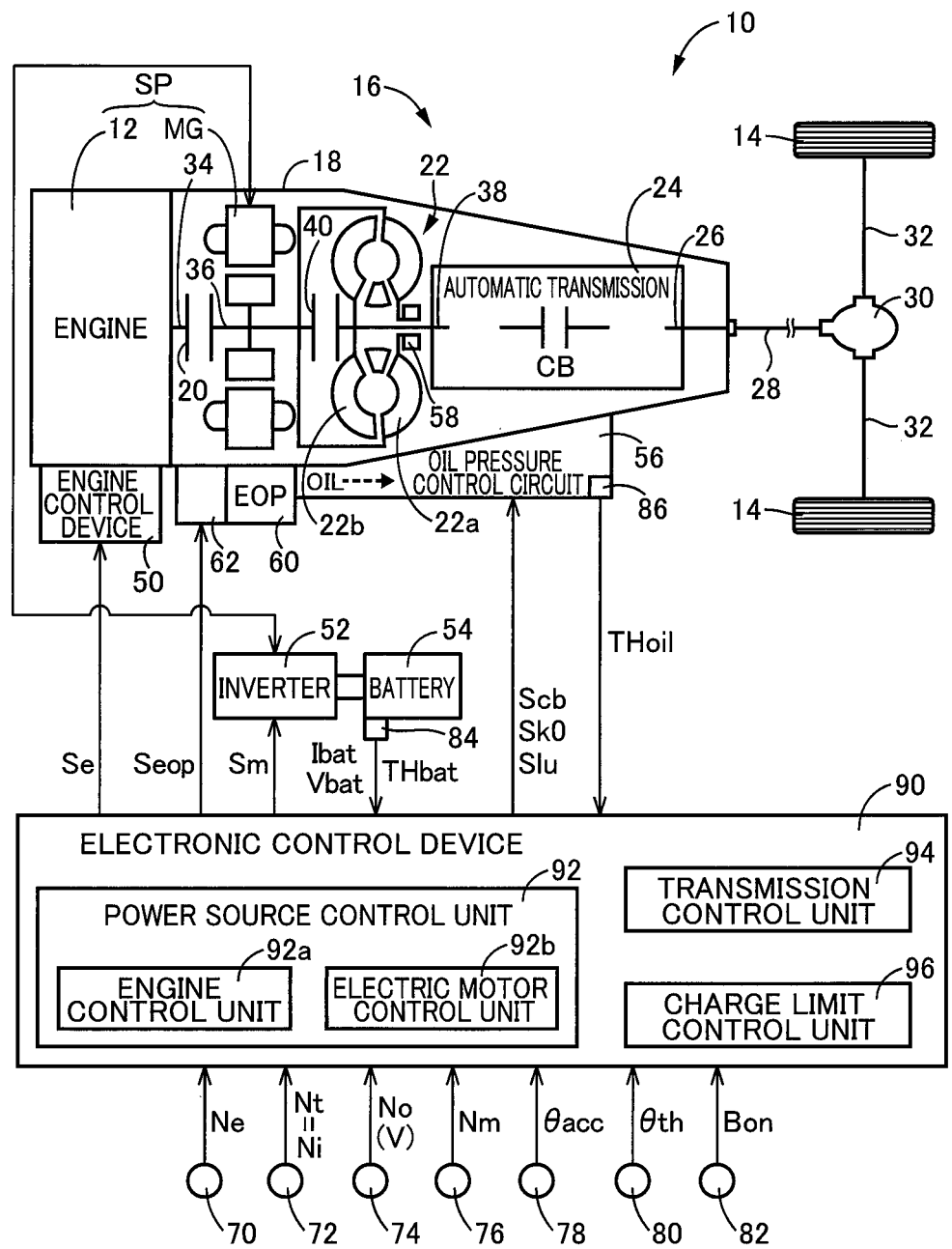
FIG. 1 is a diagram explaining a schematic configuration of a vehicle to which the present disclosure is applied, and is a diagram explaining control functions for various controls in the vehicle and a principal part of a control system therefor.

FIG. 1 is a diagram explaining a schematic configuration of a vehicle 10 to which the present disclosure is applied, and a diagram explaining control functions for various controls in the vehicle 10 and a principal part of a control system therefor. In FIG. 1, the vehicle 10 is a hybrid vehicle including an engine 12 and an electric motor MG that serve as a power source SP. The vehicle 10 includes driving wheels 14 and a power transmission device 16 disposed on a power transmission path between the engine 12 and the driving wheels 14.

The engine 12 is a publicly known internal combustion engine such as a gasoline engine or a diesel engine. In the engine 12, the torque of the engine 12, engine torque $T_e$, is controlled by controlling an engine control device 50 including a throttle actuator, a fuel injector, an ignitor, etc. disposed in the vehicle 10, by an electronic control unit 90 that will be described later.

The electric motor MG is a so-called motor generator that is a rotary electric machine functioning as both a mover that generates mechanical power from electric power and a generator that generates electric power from mechanical power. The electric motor MG is connected, via an inverter 52 disposed in the vehicle 10, to a battery 54 disposed in the vehicle 10. The battery 54 is an electric-power accumulator supplying/receiving electric power to/from the electric motor MG. In the electric motor MG, the torque of the electric motor MG, MG torque $T_m$, is controlled by controlling the inverter 52 by the electronic control unit 90 that will be described later. For example, if the electric motor MG has a forward rotation direction that is the same rotation direction as when the engine 12 is operating, the MG torque $T_m$ is a positive motoring torque on the acceleration side and is a negative regenerative torque on the deceleration side. The electric power means electric energy if not particularly distinguished. The power means driving force, torque, or force if not particularly distinguished.

The power transmission device 16 includes a K0 clutch 20, a torque converter 22, an automatic transmission 24, etc. within a case 18 that is a non-rotating member fitted to a vehicle body. The K0 clutch 20 is a clutch disposed between the engine 12 and the electric motor MG on the power transmission path between the engine 12 and the driving wheels 14. The torque converter 22 is connected via the K0 clutch 20 to the engine 12. The automatic transmission 24 is coupled to the torque converter 22 and lies on a power transmission path between the torque converter 22 and the driving wheels 14. The automatic transmission 24 is a transmission disposed between the electric motor MG and the driving wheels 14 on the power transmission path between the engine 12 and the driving wheels 14. The power transmission device 16 includes a propeller shaft 28 coupled to a transmission output shaft 26 that is an output rotary member of the automatic transmission 24, a differential gear 30 coupled to the propeller shaft 28, a pair of drive shafts 32 coupled to the differential gear 30, etc. The power transmission device 16 includes an engine coupling shaft 34 coupling the engine 12 and the K0 clutch 20, an electric motor coupling shaft 36 coupling the K0 clutch 20 and the torque converter 22, etc. The K0 clutch 20 is a clutch disposed on a power transmission path between the engine 12 and the electric motor coupling shaft 36.

Inside the case 18, the electric motor MG is coupled to the electric motor coupling shaft 36 in a power transmittable manner. That is, the electric motor MG is coupled, in a power transmittable manner, to the power transmission path between the engine 12 and the driving wheels 14, particularly, to the power transmission path between the K0 clutch 20 and the torque converter 22. In other words, the electric motor MG is coupled to the torque converter 22 and the automatic transmission 24 in a power transmittable manner without the K0 clutch 20 intervening therebetween.

The torque converter 22 includes a pump blade wheel 22a coupled to the electric motor coupling shaft 36 and a turbine blade wheel 22b coupled to a transmission input shaft 38 that is an input rotary member of the automatic transmission 24. The torque converter 22 is a hydrodynamic power transmission device that transmits power from the power source SP via a fluid from the electric motor coupling shaft 36 to the transmission input shaft 38. The torque converter 22 includes an LU clutch 40 as a direct-coupling clutch that couples the pump blade wheel 22a and the turbine blade wheel 22b, i.e., that couples the electric motor coupling shaft 36 and the transmission input shaft 38. The LU clutch 40 is a publicly known lockup clutch.

The electric motor coupling shaft 36 is a power transmission shaft to which the electric motor MG is coupled in a power transmittable manner and to which the engine 12 is coupled via the K0 clutch 20 in a power transmittable manner. The transmission input shaft 38 is a power transmission shaft to which the electric motor MG is coupled via the torque converter 22 in a power transmittable manner and to which the engine 12 is coupled via the K0 clutch 20 and the torque converter 22 in a power transmittable manner. That is, the electric motor coupling shaft 36 and the transmission input shaft 38 each function as the power transmission shaft to which the power source SP is coupled in a power transmittable manner.

The automatic transmission 24 is a publicly known planetary gear type automatic transmission that includes, for example, a set of or plural sets of planetary gears not shown and engagement devices CB. The engagement devices CB include, for example, a plurality of hydraulic engagement devices e.g. publicly known friction engagement devices. The working state i.e. control state, such as engaged state, slip state, or released state, of each of the engagement devices CB is switched by changing a CB torque $T_{cb}$ i.e. a torque capacity of the engagement device CB by a CB oil pressure $PR_{cb}$ that is a regulated oil pressure supplied from an oil pressure control circuit 56 disposed in the vehicle 10.

The automatic transmission 24 is a stepped transmission in which engagement of any of the engagement devices CB forms any of a plurality of shift stages (also called gear stages) each having a different shift ratio (also called gear ratio) $\gamma_{at}$(=AT input rotation number $N_i$/AT output rotation number $N_o$). In the automatic transmission 24, the gear stage to be formed is switched by switching the control state of one engagement device involved in shifting of the automatic transmission 24, of the engagement devices CB, in response to a driver's accelerator operation, a vehicle velocity V, etc., by the electronic control unit 90 that will be described later. The AT input rotation number $N_i$ is a rotation number of the transmission input shaft 38 and an input rotation number of the automatic transmission 24. The AT input rotation number $N_i$ is equal to a turbine rotation number $N_t$ that is an output rotation number of the torque converter 22. The AT input rotation number $N_i$ is represented by the turbine rotation number $N_t$. The AT output rotation number $N_o$ is a rotation number of the transmission output shaft 26 and is an output rotation number of the automatic transmission 24.

The K0 clutch 20 is a hydraulic friction engagement device composed of e.g. a multi-plate or single-plate clutch and is a clutch of wet type or dry type. The control state, such as engaged state, slip state, or released state, of the K0 clutch 20 is switched by changing a K0 torque $T_{k0}$ i.e. a torque capacity of the K0 clutch 20 by a K0 oil pressure $PR_{k0}$ that is a regulated oil pressure supplied from the oil pressure control circuit 56.

In the vehicle 10, when the K0 clutch 20 is in the engaged state, the engine 12 and the torque converter 22 are coupled together in a power transmittable manner. On the other hand, when the K0 clutch 20 is in the released state, power transmission is cut off between the engine 12 and the torque converter 22. Since the electric motor MG is coupled to the torque converter 22, the K0 clutch 20 acts as a clutch for connecting/disconnecting the engine 12 to/from the electric motor MG.

In the power transmission device 16, when the K0 clutch 20 is engaged, power output from the engine 12 is transmitted from the engine coupling shaft 34 through the K0 clutch 20, the electric motor coupling shaft 36, the torque converter 22, the automatic transmission 24, the propeller shaft 28, the differential gear 30, the drive shafts 32, etc. in the mentioned order, to the driving wheels 14. Irrespective of the control state of the K0 clutch 20, power output from the electric motor MG is transmitted from the electric motor coupling shaft 36 through the torque converter 22, automatic transmission 24, the propeller shaft 28, the differential gear 30, the drive shafts 32, etc. in the mentioned order, to the driving wheels 14. The automatic transmission 24 transmits a power source torque $T_{sp}$ i.e. a torque of the power source SP input to the electric motor coupling shaft 36, to the driving wheels 14. The power source torque $T_{sp}$ is a combined torque of the engine torque $T_e$ and the MG torque $T_m$. In this manner, the power transmission device 16 transmits the power source torque $T_{sp}$ input to the electric motor coupling shaft 36 and the transmission input shaft 38, to the driving wheels 14.

The vehicle 10 includes an MOP 58 that is a mechanical oil pump, an EOP 60 that is an electric oil pump, a pump motor 62, etc. The MOP 58 is coupled to the pump blade wheel 22a and rotationally driven by the power source SP to discharge working oil OIL for use in the power transmission device 16. The pump motor 62 is a motor dedicated to the EOP 60, for rotationally driving the EOP 60. The EOP 60 is rotationally driven by the pump motor 62 to discharge working oil OIL. Working oil OIL discharged from the MOP 58 and the EOP 60 is supplied to the oil pressure control circuit 56. The oil pressure control circuit 56 supplies CB oil pressure $PR_{cb}$, K0 oil pressure $PR_{k0}$, etc. that are each regulated based on working oil OIL discharged from the MOP 58 and/or the EOP 60.

The vehicle 10 further includes the electronic control unit 90 including the control device of the vehicle 10. The electronic control unit 90 is configured to include, for example, a so-called microcomputer having a CPU, a RAM, a ROM, an I/O interface, etc., the CPU performing signal processing in accordance with a program previously stored in the ROM while utilizing a temporary storage function of the RAM, to thereby execute various controls of the vehicle 10. The electronic control unit 90 is configured including, if necessary, computers for engine control, for electric motor control, for clutch control, for transmission control, etc.

The electronic control unit 90 receives various signals, etc. (for example, an engine rotation number $N_e$ i.e. the rotation speed of the engine 12, the turbine rotation number $N_t$ equal to the AT input rotation number $N_i$, the AT output rotation number No corresponding to the vehicle velocity V, an MG rotation number $N_m$ i.e. the rotation speed of the electric motor MG, an accelerator opening $\theta_{acc}$ i.e. the amount of a driver's accelerator operation indicative of the magnitude of a driver's acceleration operation, a throttle valve opening $\theta_{th}$ i.e. the opening degree of an electronic throttle valve, a brake-on signal $B_{on}$ i.e. a signal indicative of the state where a brake pedal for actuating wheel brakes is operated by the driver, a battery temperature $TH_{bat}$, a battery charge/discharge current $I_{bat}$, and a battery voltage $V_{bat}$ of the battery 54, a working oil temperature $TH_{oil}$ i.e. the temperature of working oil OIL within the oil pressure control circuit 56, etc.) that are respectively based on detection values of various sensors, etc. (for example, an engine rotation number sensor 70, a turbine rotation number sensor 72, an output rotation number sensor 74, an MG rotation number sensor 76, an accelerator opening sensor 78, a throttle valve opening sensor 80, a brake switch 82, a battery sensor 84, an oil temperature sensor 86, etc.) disposed in the vehicle 10.

The electronic control unit 90 calculates a remaining battery charge SOC [%], based on e.g. the battery charge/discharge current $I_{bat}$, the battery voltage $V_{bat}$, etc. The remaining battery charge SOC is a remaining charge of the battery 54 and is a state-of-charge value i.e. a value indicative of the state of charge of the battery 54. The electronic control unit 90 calculates a chargeable power $W_{in}$ [W] and a dischargeable power $W_{out}$ [W] of the battery 54, based on e.g. the battery temperature $TH_{bat}$ and the remaining battery charge SOC. The chargeable power $W_{in}$ of the battery 54 is a maximum chargeable power of the battery 54 specified in consideration of durability, etc. of the battery 54, that is, a maximum power permitting input to the battery 54. The dischargeable power $W_{out}$ of the battery 54 is a maximum dischargeable power of the battery 54 specified in consideration of durability, etc. of the battery 54, that is, a maximum power permitting output from the battery 54.

The electronic control unit 90 outputs respectively various command signals (e.g. an engine control command signal $S_e$ for controlling the engine 12, an MG control command signal $S_m$ for controlling the electric motor MG, a CB oil pressure control command signal $S_{cb}$ for controlling the engagement devices CB, a K0 oil pressure control command signal $S_{k0}$ for controlling the K0 clutch 20, an LU oil pressure control command signal $S_{lu}$ for controlling the LU clutch 40, an EOP control command signal $S_{eop}$ for controlling the EOP 60, etc.) to the devices (e.g. the engine control device 50, the inverter 52, the oil pressure control circuit 56, the pump motor 62, etc.) disposed in the vehicle 10.

In order to implement various controls in the vehicle 10, the electronic control unit 90 includes a power source control unit 92 and a transmission control unit 94.

The power source control unit 92 is a hybrid control unit that includes both a function as an engine control unit 92a controlling the action of the engine 12 and a function as an electric motor control unit 92b controlling the action of the electric motor MG via the inverter 52, to execute hybrid drive control, etc. of the engine 12 and the electric motor MG via those control functions.

The power source control unit 92 applies the accelerator opening $\theta_{acc}$ and the vehicle velocity V to a drive-demand-amount map for example, to calculate a driver's drive demand amount for the vehicle 10. The drive-demandamount map represents relationships obtained experimentally or by design in advance and stored, that is, relationships defined in advance. The drive demand amount is, for example, a demanded driving torque $T_{rdem}$ on the driving wheels 14. In other words, the demanded driving torque $T_{rdem}$ [Nm] is a demanded driving power $P_{rdem}$ [W] at the vehicle velocity V at that time. The drive demand amount may also be e.g. a demanded driving force $F_{rdem}$ [N] on the driving wheels 14 or a demanded AT output torque on the transmission output shaft 26. For calculation of the drive demand amount, the AT output rotation number $N_o$ or the like may be used in place of the vehicle velocity V.

The power source control unit 92 calculates a demanded system shaft torque $T_{sysdem}$ for achieving the demanded driving torque $T_{rdem}$, in consideration of the power transmission loss, the gear ratio $\gamma_{at}$ of the automatic transmission 24, etc. The power source control unit 92 issues the engine control command signal $S_e$ for controlling the engine 12 and the MG control command signal $S_m$ for controlling the electric motor MG so as to obtain a power source torque $T_{sp}$ achieving the demanded system shaft torque $T_{sysdem}$. The demanded system shaft torque $T_{sysdem}$ is a demand value of a system shaft torque $T_{sys}$. The system shaft torque $T_{sys}$ is a power transmission shaft torque i.e. a torque on the power transmission shaft transmitted to the driving wheels 14, of the power source torque $T_{sp}$, that is, a torque used as a driving torque $T_r$. In the embodiment, a torque on the transmission input shaft 38 is exemplified as the system shaft torque $T_{sys}$. The difference between the torque on the transmission input shaft 38 and the torque on the electric motor coupling shaft 36 is a difference arising from the torque ratio (=turbine torque/pump torque) of the torque converter 22, and the system shaft torque $T_{sys}$ may be the torque on the electric motor coupling shaft 36. The torque ratio of the torque converter 22 is a function of a rotation-number ratio (=turbine rotation number $N_t$/pump rotation number) of the torque converter 22 and is calculated by applying the actual velocity ratio to predefined relationships between the velocity ratio and the torque ratio. The pump rotation number is equal to the MG rotation number $N_m$.

If the demanded system shaft torque $T_{sysdem}$ can be covered by only the output of the electric motor MG, the power source control unit 92 establishes a motor drive mode i.e. a BEV drive mode as a drive mode for driving the vehicle 10. The BEV drive mode is an electric drive mode allowing motor running i.e. electric running (=BEV running) in which the vehicle 10 runs using only the electric motor MG as the power source SP with the engine 12 stopping its operation while the K0 clutch 20 is released. On one hand, in the case where the demanded system shaft torque $T_{sysdem}$ cannot be covered if not using at least the output of the engine 12, the power source control unit 92 establishes an engine drive mode i.e. an HEV drive mode as the drive mode. The HEV drive mode is a hybrid drive mode allowing hybrid running (=HEV running) i.e. engine running in which the vehicle 10 runs using at least the engine 12 as the power source SP with the K0 clutch 20 engaged. On the other hand, even if the demanded system shaft torque $T_{sysdem}$ can be covered by only the output of the electric motor MG, the power source control unit 92 establishes the HEV drive mode as the drive mode in the case e.g. where the battery 54 needs to be charged or where the engine 12, etc. need to be warmed up.

The case where the battery 54 needs to be charged includes, for example, the case where the remaining battery charge SOC is to be kept at a specified value, the case where the remaining battery charge SOC drops below a specified range, or the case where charging of the battery 54 improves the energy efficiency though the remaining battery charge SOC lies within the specified range.

Based on e.g. a difference between a target value and an actual value of the remaining battery charge SOC, the power source control unit 92 calculates a demanded charging power $W_{chgdem}$ i.e. a demand value of charging power $W_{chg}$ [W] charged into the battery 54 by power generation of the electric motor MG. In the case e.g. where charge of the battery 54 becomes necessary during running of the vehicle 10 in a driving state, the power source control unit 92 performs charge control $CT_{chg}$ to increase the engine torque $T_e$, for the engine torque $T_e$ achieving the demanded system shaft torque $T_{sysdem}$ corresponding to the demanded driving torque $T_{rdem}$, so as to achieve the demanded charging power $W_{chgdem}$. If charge of the battery 54 becomes necessary during the HEV running, the engine torque $T_e$ is increased by the amount to be charged. If charge of the battery 54 is required during the BEV running, the engine 12 is started to generate the system shaft torque $T_{sys}$ by the engine 12 in place of the electric motor MG so that the engine torque $T_e$ is increased by the amount to be charged. The driving state of the vehicle 10 is the state where the driving wheels 14 are rotationally driven by the power source torque $T_{sp}$. The driven state of the vehicle 10 is the state where the power source SP is rotationally driven by a torque input from the driving wheels 14.

Using e.g. a shift map representing predefined relationships, the transmission control unit 94 performs shift determination of the automatic transmission 24, and as needed, i.e., according to the result of the shift determination, issues a CB oil pressure control command signal $S_{cb}$ for executing shift control of the automatic transmission 24, to the oil pressure control circuit 56. In the shift control of the automatic transmission 24, the transmission control unit 94 performs shifting of the automatic transmission 24 by switching to the released state of the release-side engagement device of the engagement devices CB and by switching to the engaged state of the engage-side engagement device of the engagement devices CB. The shift map represents predetermined relationships having shift lines for determining shifting of the automatic transmission 24 on two-dimensional coordinates with e.g. the vehicle velocity V and the demanded driving torque $T_{rdem}$ as variables. In the shift map, the vehicle velocity V may be replaced with the AT output rotation number $N_o$ or the like, or the demanded driving torque $T_{rdem}$ may be substituted with the demanded driving force $F_{rdem}$, the accelerator opening $\theta_{acc}$, the throttle valve opening $\theta_{th}$, or the like.

If the accelerator goes off or close to off during running of the vehicle 10 in the driving state, the vehicle 10 is switched from the driving state to the driven state so as to create a feeling of slowing down. When the vehicle 10 is switched from the driving state to the driven state, there occurs backlash between the rotating members of the power transmission device 16, i.e., tooth strike due to reversal of the direction in which the gear backlash is reduced. Therefore, there may occur a so-called tip-out shock i.e. a backlash reduction shock due to the tooth strike upon the tip out i.e. at the time of switching from the driving state to the driven state. To deal with this, the power source control unit 92 moderates changes in the system shaft torque $T_{sys}$ so as to suppress the tip-out shock depending on the tip out of the vehicle 10.

If the charge control $CT_{chg}$ is performed while the vehicle 10 runs in the driving state, the engine torque $T_e$ is increased by the charge amount. In the range where the engine torque $T_e$ is high, calculation accuracy of an estimated engine torque $T_{ee}$ i.e. an estimated value of the engine torque $T_e$ tends to become worse. That is, in the range with a high engine torque $T_e$, the difference tends to become larger between the estimated engine torque $T_{ee}$ and a real engine torque $T_{er}$ i.e. an actual value of the engine torque $T_e$. On the other hand, if the accelerator goes off for example with the charge control $CT_{chg}$ performed while the vehicle 10 runs in the driving state, the MG torque $T_m$ is controlled depending on the reduction in the estimated engine torque $T_{ee}$, so that the vehicle 10 is switched from the driving state to the driven state. If the calculation accuracy of the estimated engine torque $T_{ee}$ is poor when moderately changing the system shaft torque $T_{sys}$ through control of the MG torque $T_m$ adapted to the tip out, smooth passage through a zero value of the system shaft torque $T_{sys}$ may become difficult. That is, proper generation of the backlash-reduction MG torque $T_m$ for the real engine torque $T_{er}$ may become difficult upon the tip out. This may prevent the MG torque $T_m$ from providing a proper tip-out shock suppression effect. The estimated engine torque $T_{ee}$ is calculated by applying the engine rotation number $N_e$ and the throttle valve opening $\theta_{th}$ to e.g. an engine-torque map defined in advance.

If the engine rotation number $N_e$ is low when the charge control $CT_{chg}$ is being performed during the running of the vehicle 10 in the driving state, a high engine torque $T_e$ is required to obtain an engine power $P_e$ that is a power of the engine 12 for achieving the demanded charging power $W_{chgdem}$. That is, while executing the charge control $CT_{chg}$, the engine torque $T_e$ tends to become higher in the range where the engine rotation number $N_e$ is low. For this reason, it becomes hard to suppress the tip-out shock in range where the engine rotation number $N_e$ is low during execution of the charge control $CT_{chg}$. Since the K0 clutch 20 is in the engaged state during HEV running, the engine rotation number $N_e$ is equal to the MG rotation number $N_m$. The difference between the MG rotation number $N_m$ and the turbine rotation number $N_t$ is a difference corresponding to the rotation-number ratio of the torque converter 22, so that both the MG rotation number $N_m$ and the turbine rotation number $N_t$ may be a system shaft rotation number $N_{sys}$ i.e. the rotation number of the power transmission shaft. From the above, it becomes hard to suppress the tip-out shock in the range where the system shaft rotation number $N_{sys}$ is low during execution of the charge control $CT_{chg}$.

In the range where the demanded driving torque $T_{rdem}$ i.e. the system shaft torque $T_{sys}$ for achieving the demanded driving torque $T_{rdem}$ is low, the degree of influence tends to become larger that arises from deviation of the real engine torque $T_{er}$ from the estimated engine torque $T_{ee}$. Accordingly, it becomes hard to suppress the tip-out shock in the range where the demanded driving torque $T_{rdem}$ i.e. the system shaft torque $T_{sys}$ is low during execution of the charge control $CT_{chg}$. From a different aspect, suppression of the tip-out shock becomes hard because the time for lowering the engine torque $T_e$ upon tip-out is shortened in the range where the system shaft torque $T_{sys}$ is low.

Thus, the electronic control unit 90 further includes a charge limit control unit 96.

The charge limit control unit 96 performs charge limit control $CT_{limchg}$ limiting the charging power $W_{chg}$ in charge control $CT_{chg}$ if the system shaft rotation number $N_{sys}$ is equal to or less than a fixed rotation number $N_{sysf}$ and if the system shaft torque $T_{sys}$ is equal to or less than a fixed torque $T_{sysf}$. On the other hand, the charge limit control unit 96 does not perform the charge limit control $CT_{limchg}$ if the system shaft rotation number $N_{sys}$ exceeds the fixed rotation number $N_{sysf}$ or if the system shaft torque $T_{sys}$ exceeds the fixed torque $T_{sysf}$. The fixed rotation number $N_{sysf}$ and the fixed torque $T_{sysf}$ are previously defined threshold values for determining a vehicle state upon execution of the charge control $CT_{chg}$, which makes it difficult to suppress the tip-out shock when tip-out occurs. The system shaft torque $T_{sys}$ used in determining whether to perform the charge limit control $CT_{limchg}$ may be an actual value or the demanded system shaft torque $T_{sysdem}$. In the embodiment, the demanded system shaft torque $T_{sysdem}$ is used.

Specifically, the charge limit control unit 96 determines whether the system shaft rotation number $N_{sys}$ is equal to or less than the fixed rotation number $N_{sysf}$. The charge limit control unit 96 determines whether the demanded system shaft torque $T_{sysdem}$ is equal to or less than the fixed torque $T_{sysf}$. The charge limit control unit 96 performs the charge limit control $CT_{limchg}$ if it determines that the system shaft rotation number $N_{sys}$ is equal to or less than the fixed rotation number $N_{sysf}$ and if it determines that the demanded system shaft torque $T_{sysdem}$ is equal to or less than the fixed torque $T_{sysf}$. The charge limit control unit 96 does not perform the charge limit control $CT_{limchg}$ if it determines that the system shaft rotation number $N_{sys}$ exceeds the fixed rotation number $N_{sysf}$ or if it determines that the demanded system shaft torque $T_{sysdem}$ exceeds the fixed torque $T_{sysf}$.

In the low vehicle velocity V range, increased tip-out shock sensitivity tends to appear for the calculation error of the estimated engine torque $T_{ee}$. Hence, the charge limit control unit 96 may perform the charge limit control $CT_{limchg}$ when the vehicle velocity V lies in a relatively low vehicle velocity range. For example, the charge limit control unit 96 performs the charge limit control $CT_{limchg}$ if the vehicle velocity V is equal to or less than a fixed vehicle velocity $V_f$. On the other hand, the charge limit control unit 96 does not perform the charge limit control $CT_{limchg}$ if the vehicle velocity V exceeds the fixed vehicle velocity $V_f$. The fixed vehicle velocity $V_f$ is a threshold value for determining the execution of the charge limit control $CT_{limchg}$ in consideration of the tip-out shock sensitivity.

When the gear stage of the automatic transmission 24 is a low-vehicle-velocity-side gear stage (=low gear stage), increased tip-out shock sensitivity tends to appear for the calculation error of the estimated engine torque $T_{ee}$. For this reason, the charge limit control unit 96 may perform the charge limit control $CT_{limchg}$ when the gear stage of the automatic transmission 24 is the low gear stage. For example, the charge limit control unit 96 performs the charge limit control $CT_{limchg}$ if the gear ratio $\gamma_{at}$ of the automatic transmission 24 is a predetermined low-vehicle-velocity-side gear ratio i.e. a fixed low-side gear ratio $\gamma_{atf}$. On the other hand, the charge limit control unit 96 does not perform the charge limit control $CT_{limchg}$ if the gear ratio $\gamma_{at}$ is on higher vehicle-velocity side (=higher side) than the fixed low-side gear ratio $\gamma_{atf}$. The fixed low-side gear ratio $\gamma_{atf}$ is, for example, a gear ratio $\gamma_{at}$ defined in advance for determining the execution of the charge limit control $CT_{limchg}$ in consideration of the tip-out shock sensitivity. For example, if the automatic transmission 24 is a 10-speed forward transmission, the fixed low-side gear ratio $\gamma_{atf}$ is gear ratios $\gamma_{at}$ corresponding to gear stages from a first gear stage ($1^{st}$) to a fourth gear stage ($4^{th}$).

For example, the charge limit control unit 96 sets an upper-limit charging power $W_{chgul}$ that is an upper limit of the charging power $W_{chg}$ for use in limiting the charging power $W_{chg}$ and suppresses the demanded charging power $W_{chgdem}$ so that the charging power $W_{chg}$ is reduced to the upper-limit charging power $W_{chgul}$, to thereby perform the charge limit control $CT_{limchg}$. If the upper-limit charging power $W_{chgul}$ is equal to or greater than the demanded charging power $W_{chgdem}$ the demanded charging power $W_{chgdem}$ can be achieved even if the charge limit control $CT_{limchg}$ is performed.

The charge limit control unit 96 applies the system shaft rotation number $N_{sys}$ and the demanded system shaft torque $T_{sysdem}$ to an upper-limit-value map representing predefined relationships for example, to thereby set the upper-limit charging power $W_{chgul}$.

Figure 2:
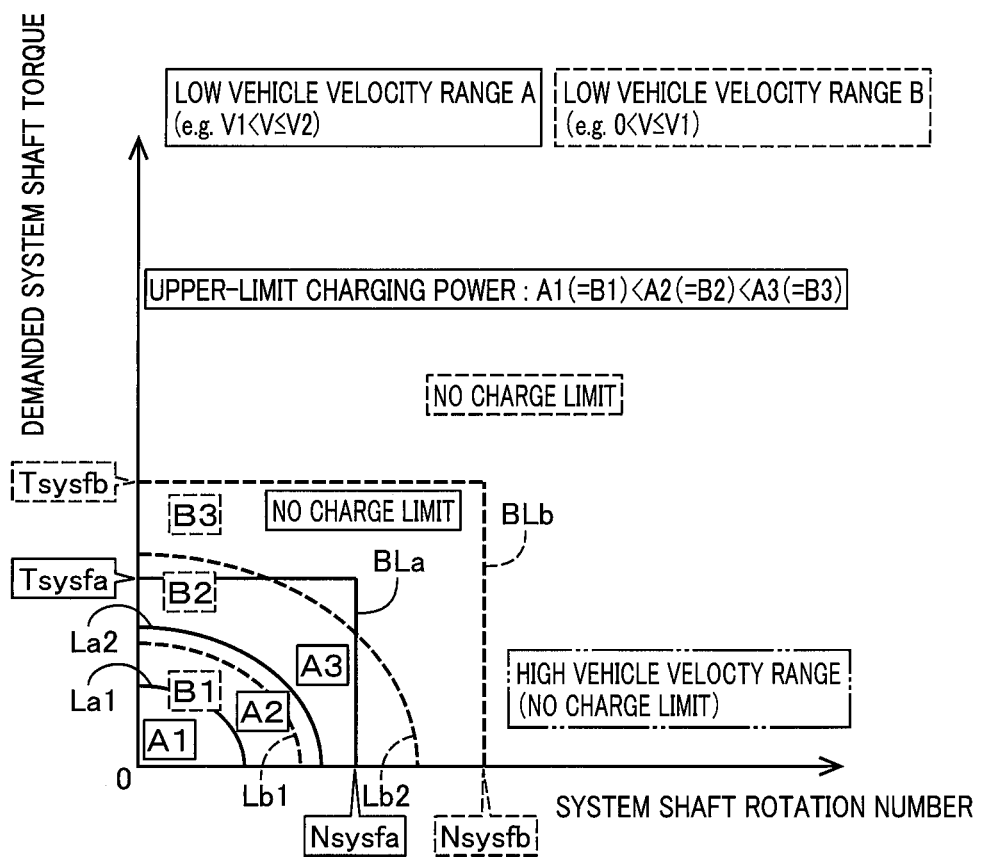
FIG. 2 is a diagram showing an example of an upper-limit-value map for use in setting an upper-limit charging power and is a diagram explaining the example of the upper-limit-value map differing for each of vehicle velocity ranges.
Figure 3:
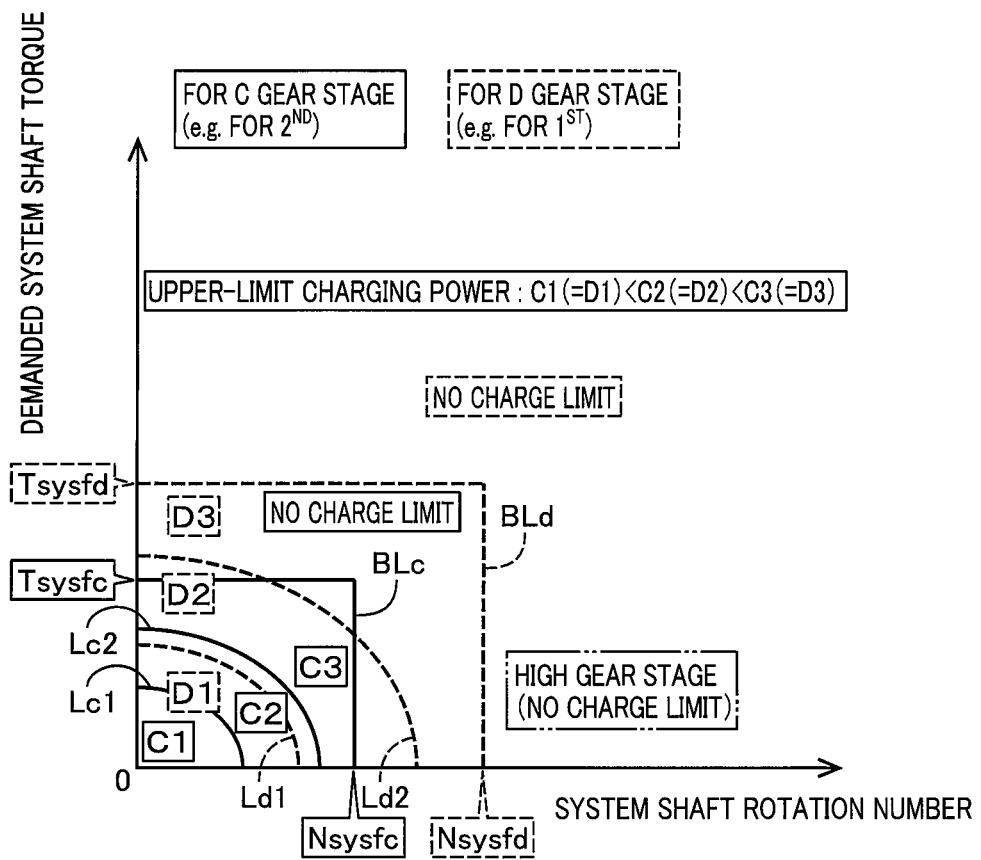
FIG. 3 is a diagram showing an example of the upper-limit-value map for use in setting the upper-limit charging power and is a diagram explaining the example of the upper-limit-value map differing for each of gear stages of an automatic transmission.

FIGS. 2 and 3 are diagrams each showing an example of the upper-limit-value map for use in setting the upper-limit charging power $W_{chgul}$. FIG. 2 is a diagram explaining the example of the upper-limit-value map differing for each of ranges of the vehicle velocity V, i.e., for each vehicle velocity range. FIG. 3 is a diagram explaining the example of the upper-limit-value map differing for each of gear stages of the automatic transmission 24. The upper-limit-value maps of FIGS. 2 and 3 each represent predetermined relationships in which ranges having different values of the upper-limit charging power $W_{chgul}$ are defined in advance on the the the two-dimensional coordinates with e.g. the system shaft rotation number $N_{sys}$ and the demanded system shaft torque $T_{sysdem}$ as variables.

In FIG. 2, $N_{sysfa}$ and $N_{sysfb}$ each denote the fixed rotation number $N_{sysf}$, $T_{sysfa}$ and $T_{sysfb}$ each denote the fixed torque $T_{sysf}$, A1, A2, A3, B1, B2, and B3 each denote the upper-limit charging power $W_{chgul}$. The fixed rotation number $N_{sysfa}$ and the fixed torque $T_{sysfa}$ indicated by a solid line $BL_a$ are threshold values if the vehicle velocity V lies in a low vehicle velocity range A. The low vehicle velocity range A is a vehicle velocity range e.g. where the vehicle velocity V exceeds a vehicle velocity V1 and is equal to or less than a vehicle velocity V2. The fixed rotation number $N_{sysfb}$ and the fixed torque $T_{sysfb}$ indicated by a broken line $BL_b$ are threshold values if the vehicle velocity V lies in a low vehicle velocity range B. The low vehicle velocity range B is a vehicle velocity range e.g. where the vehicle velocity V is greater than 0 and is equal to or less than V1. The upper-limit charging powers A1, A2, and A3 are upper-limit charging powers $W_{chgul}$ if the vehicle velocity V lies in the low vehicle velocity range A. The upper-limit charging power A1 is an upper-limit charging power $W_{chgul}$ that is set in a range having a lower system shaft rotation number $N_{sys}$ and a lower demanded system shaft torque $T_{sysdem}$ than a solid line $L_{a1}$. The upper-limit charging power A2 is an upper-limit charging power $W_{chgul}$ that is set in a range having a higher system shaft rotation number $N_{sys}$ and a higher demanded system shaft torque $T_{sysdem}$ than the solid line $L_{a1}$ and having a lower system shaft rotation number $N_{sys}$ and a lower demanded system shaft torque $T_{sysdem}$ than a solid line $L_{a2}$. The upper-limit charging power A3 is an upper-limit charging power $W_{chgul}$ that is set in a range having a higher system shaft rotation number $N_{sys}$ and a higher demanded system shaft torque $T_{sysdem}$ than the solid line $L_{a2}$ and having a lower system shaft rotation number $N_{sys}$ and a lower demanded system shaft torque $T_{sysdem}$ than the solid line $B_{La}$. The upper-limit charging powers B1, B2, and B3 are upper-limit charging powers $W_{chgul}$ if the vehicle velocity V lies in the low vehicle velocity range B. The upper-limit charging power B1 is an upper-limit charging power $W_{chgul}$ that is set in a range having a lower system shaft rotation number $N_{sys}$ and a lower demanded system shaft torque $T_{sysdem}$ than a broken line $L_{b1}$. The upper-limit charging power B2 is an upper-limit charging power $W_{chgul}$ that is set in a range having a higher system shaft rotation number $N_{sys}$ and a higher demanded system shaft torque $T_{sysdem}$ than the broken line $L_{b1}$ and having a lower system shaft rotation number $N_{sys}$ and a lower demanded system shaft torque $T_{sysdem}$ than a broken line $L_{b2}$. The upper-limit charging power B3 is an upper-limit charging power $W_{chgul}$ that is set in a range having a higher system shaft rotation number $N_{sys}$ and a higher demanded system shaft torque $T_{sysdem}$ than the broken line $L_{b2}$ and having a lower system shaft rotation number $N_{sys}$ and a lower demanded system shaft torque $T_{sysdem}$ than the broken line $BL_b$.

Since the low vehicle velocity ranges A and B are both a low vehicle velocity range where the vehicle velocity V is equal to or less than the fixed vehicle velocity $V_f$, the upper-limit charging power $W_{chgul}$ is set in each of the low vehicle velocity ranges A and B so that the charge limit control $CT_{limchg}$ is performed. Specifically, for the low vehicle velocity range A, the upper-limit charging power $W_{chgul}$ is not set without the charge limit control $CT_{limchg}$ in a range having a higher system shaft rotation number $N_{sys}$ and a higher demanded system shaft torque $T_{sysdem}$ than the solid line $BL_a$. For the low vehicle velocity range A, the upper-limit charging power $W_{chgul}$ is set so that the charge limit control $CT_{limchg}$ is performed in the range having a lower system shaft rotation number $N_{sys}$ and a lower demanded system shaft torque $T_{sysdem}$ than the solid line $BL_a$. For the low vehicle velocity range B, the upper-limit charging power $W_{chgul}$ is not set without the charge limit control $CT_{limchg}$ in a range having a higher system shaft rotation number $N_{sys}$ and a higher demanded system shaft torque $T_{sysdem}$ than the broken line $BL_b$. For the low vehicle velocity range B, the upper-limit charging power $W_{chgul}$ is set so that the charge limit control $CT_{limchg}$ is performed in the range having a lower system shaft rotation number $N_{sys}$ and a lower demanded system shaft torque $T_{sysdem}$ than the broken line $BL_b$. On the other hand, when the vehicle velocity V lies in a high vehicle velocity range exceeding the fixed vehicle velocity $V_f$, the upper-limit charging power $W_{chgul}$ is not set without performing the charge limit control $CT_{limchg}$.

The lower the vehicle velocity V is, the higher the tip-out shock sensitivity tends to become. Therefore, according as the vehicle velocity V is lower, the charge limit control $CT_{limchg}$ may be performed for a range having a higher system shaft rotation number $N_{sys}$ and/or having a higher demanded system shaft torque $T_{sysdem}$. The low vehicle velocity range B is a vehicle velocity range having a lower vehicle velocity than the low vehicle velocity range A. In consequence, the fixed rotation number $N_{sysfb}$ is set to a value higher than the fixed torque $T_{sysfa}$. The fixed torque $T_{sysfb}$ is set to a value higher than the fixed torque $T_{sysfa}$. Thus, in the case of performing the charge limit control $CT_{limchg}$, the charge limit control unit 96 sets at least one of the fixed rotation number $N_{sysf}$ and the fixed torque $T_{sysf}$ to a higher value according as the vehicle velocity V is lower.

According as the system shaft rotation number $N_{sys}$ is lower and/or according as the demanded system shaft torque $T_{sysdem}$ is lower, it becomes harder to suppress the tip-out shock when tipping out. Consequently, the upper-limit charging power $W_{chgul}$ may be set to a smaller value according as the system shaft rotation number $N_{sys}$ and/or the demanded system shaft torque $T_{sysdem}$ is lower. In the low vehicle velocity range A, therefore, the upper-limit charging power A1 is set to a value smaller than the upper-limit charging power A2, while the upper-limit charging power A2 is set to a value smaller than the upper-limit charging power A3. In the low vehicle velocity range B, the upper-limit charging power B1 is set to a value smaller than the upper-limit charging power B2, while the upper-limit charging power B2 is set to a value smaller than the upper-limit charging power B3. As a result, the upper-limit charging power B1 for the low vehicle velocity range B is set on a part of the range where the upper-limit charging power A2 is set for the low vehicle velocity range A. The upper-limit charging power B2 for the low vehicle velocity range B is set on a part of the range where the upper-limit charging power A3 is set for the low vehicle velocity range A. In the embodiment, the upper-limit charging powers A1 and B1 are equivalent, the upper-limit charging powers A2 and B2 are equivalent, and the upper-limit charging powers A3 and B3 are equivalent. In consequence, according as the vehicle velocity V is lower, the upper-limit charging power $W_{chgul}$ is set to a smaller value. Thus, in the case of performing the charge limit control $CT_{limchg}$, the charge limit control unit 96 sets the upper-limit charging power $W_{chgul}$ to a smaller value according as the vehicle velocity V is lower.

In FIG. 3, $N_{sysfc}$ and $N_{sysfd}$ each denote the fixed rotation number $N_{sysf}$. $T_{sysfc}$ and $T_{sysfd}$ each denote the fixed torque $T_{sysf}$. C1, C2, C3, D1, D2, and D3 each denote the upper-limit charging power $W_{chgul}$. The fixed rotation number $N_{sysfc}$ and the fixed torque $T_{sysfc}$ indicated by a solid line $BL_c$ are threshold values if the gear stage of the automatic transmission 24 is a C gear stage. The C gear stage is a second gear stage ($2^{nd}$) for example. The fixed rotation number $N_{sysfd}$ and the fixed torque $T_{sysfd}$ indicated by a broken line $BL_d$ are threshold values if the gear stage of the automatic transmission 24 is a D gear stage. The D gear stage is a first gear stage ($1^{st}$) for example. The upper-limit charging powers C1, C2, and C3 are upper-limit charging powers $W_{chgul}$ if the gear stage of the automatic transmission 24 is the C gear stage. The upper-limit charging power C1 is an upper-limit charging power $W_{chgul}$ that is set in a range having a lower system shaft rotation number $N_{sys}$ and a lower demanded system shaft torque $T_{sysdem}$ than a solid line $L_{c1}$. The upper-limit charging power C2 is an upper-limit charging power $W_{chgul}$ that is set in a range having a higher system shaft rotation number $N_{sys}$ and a higher demanded system shaft torque $T_{sysdem}$ than the solid line $L_{c1}$ and having a lower system shaft rotation number $N_{sys}$ and a lower demanded system shaft torque $T_{sysdem}$ than a solid line $L_{c2}$. The upper-limit charging power C3 is an upper-limit charging power $W_{chgul}$ that is set in a range having a higher system shaft rotation number $N_{sys}$ and a higher demanded system shaft torque $T_{sysdem}$ than the solid line $L_{c2}$ and having a lower system shaft rotation number $N_{sys}$ and a lower demanded system shaft torque $T_{sysdem}$ than the solid line $BL_c$. The upper-limit charging powers D1, D2, and D3 are upper-limit charging powers $W_{chgul}$ if the gear stage of the automatic transmission 24 is the D gear stage. The upper-limit charging power D1 is an upper-limit charging power $W_{chgul}$ that is set in a range having a lower system shaft rotation number $N_{sys}$ and a lower demanded system shaft torque $T_{sysdem}$ than a broken line $L_{d1}$. The upper-limit charging power D2 is an upper-limit charging power $W_{chgul}$ that is set in a range having a higher system shaft rotation number $N_{sys}$ and a higher demanded system shaft torque $T_{sysdem}$ than the broken line $L_{d1}$ and having a lower system shaft rotation number $N_{sys}$ and a lower demanded system shaft torque $T_{sysdem}$ than a broken line $L_{d2}$. The upper-limit charging power D3 is an upper-limit charging power $W_{chgul}$ that is set in a range having a higher system shaft rotation number $N_{sys}$ and a higher demanded system shaft torque $T_{sysdem}$ than the broken line $L_{d2}$ and having a lower system shaft rotation number $N_{sys}$ and a lower demanded system shaft torque $T_{sysdem}$ than the broken line $BL_d$.

Since the C and D gear stages are each a low gear stage where the gear ratio $\gamma_{at}$ of the automatic transmission 24 is a fixed low-side gear ratio $\gamma_{atf}$, the upper-limit charging power $W_{chgul}$ is set for each of the C and D gear stages so that the charge limit control $CT_{limchg}$ is performed. Specifically, for the C gear stage, the upper-limit charging power $W_{chgul}$ is not set without the charge limit control $CT_{limchg}$ in a range having a higher system shaft rotation number $N_{sys}$ and a higher demanded system shaft torque $T_{sysdem}$ than the solid line $BL_c$. For the C gear stage, the upper-limit charging power $W_{chgul}$ is set so that the charge limit control $CT_{limchg}$ is performed in the range having a lower system shaft rotation number $N_{sys}$ and a lower demanded system shaft torque $T_{sysdem}$ than the solid line $BL_c$. For the D gear stage, the upper-limit charging power $W_{chgul}$ is not set without the charge limit control $CT_{limchg}$ in a range having a higher system shaft rotation number $N_{sys}$ and a higher demanded system shaft torque $T_{sysdem}$ than the broken line $BL_d$. For the low vehicle velocity range B, the upper-limit charging power $W_{chgul}$ is set so that the charge limit control $CT_{limchg}$ is performed in the range having a lower system shaft rotation number $N_{sys}$ and a lower demanded system shaft torque $T_{sysdem}$ than the broken line $BL_d$. On the other hand, in the case of a high-vehicle-velocity-side gear stage (=high gear stage) where the gear ratio $\gamma_{at}$ of the automatic transmission 24 is on higher side than the fixed low-side gear ratio $\gamma_{atf}$, the upper-limit charging power $W_{chgul}$ is not set without performing the charge limit control $CT_{limchg}$.

According as the gear ratio $\gamma_{at}$ of the automatic transmission 24 is on lower vehicle-velocity side (=lower side), the tip-out shock sensitivity tends to become higher. For this reason, according as the gear ratio $\gamma_{at}$ is on lower side, the charge limit control $CT_{limchg}$ may be performed for a range having a higher system shaft rotation number $N_{sys}$ and/or having a higher demanded system shaft torque $T_{sysdem}$. The D gear stage is a lower gear stage than the C gear stage. The fixed rotation number $N_{sysfd}$ is hence set to a value higher than the fixed rotation number $N_{sysfc}$. The fixed torque $T_{sysfd}$ is set to a value higher than the fixed torque $T_{sysfc}$. Thus, in the case of performing the charge limit control $CT_{limchg}$, the charge limit control unit 96 sets at least one of the fixed rotation number $N_{sysf}$ and the fixed torque $T_{sysf}$ to a higher value according as the gear ratio $\gamma_{at}$ is on lower side.

According as the system shaft rotation number $N_{sys}$ is lower and/or according as the demanded system shaft torque $T_{sysdem}$ is lower, it becomes harder to suppress the tip-out shock when tipping out. Consequently, the upper-limit charging power $W_{chgul}$ may be set to a smaller value according as the system shaft rotation number $N_{sys}$ and/or the demanded system shaft torque $T_{sysdem}$ is lower. In the C gear stage, therefore, the upper-limit charging power C1 is set to a value smaller than the upper-limit charging power C2, while the upper-limit charging power C2 is set to a value smaller than the upper-limit charging power C3. In the D gear stage, the upper-limit charging power D1 is set to a value smaller than the upper-limit charging power D2, while the upper-limit charging power D2 is set to a value smaller than the upper-limit charging power D3. As a result, the upper-limit charging power D1 for the D gear stage is set on a part of the range where the upper-limit charging power C2 is set for the C gear stage. The upper-limit charging power D2 for the D gear stage is set on a part of the range where the upper-limit charging power C3 is set for the C gear stage. In the embodiment, the upper-limit charging powers C1 and D1 are equivalent, the upper-limit charging powers C2 and D2 are equivalent, and the upper-limit charging powers C3 and D3 are equivalent. In consequence, according as the gear ratio $\gamma_{at}$ of the automatic transmission 24 is on lower side, the upper-limit charging power $W_{chgul}$ is set to a smaller value. Thus, in the case of performing the charge limit control $CT_{limchg}$, the charge limit control unit 96 sets the upper-limit charging power $W_{chgul}$ to a smaller value according as the gear ratio $\gamma_{at}$ of the automatic transmission 24 is on lower side.

Referring to FIGS. 2 and 3, in the case of performing the charge limit control $CT_{limchg}$, the charge limit control unit 96 sets the upper-limit charging power $W_{chgul}$ to a smaller value according as the system shaft rotation number $N_{sys}$ is lower. In the case of performing the charge limit control $CT_{limchg}$, the charge limit control unit 96 sets the upper-limit charging power $W_{chgul}$ to a smaller value according as the demanded system shaft torque $T_{sysdem}$ is lower.

Figure 4:
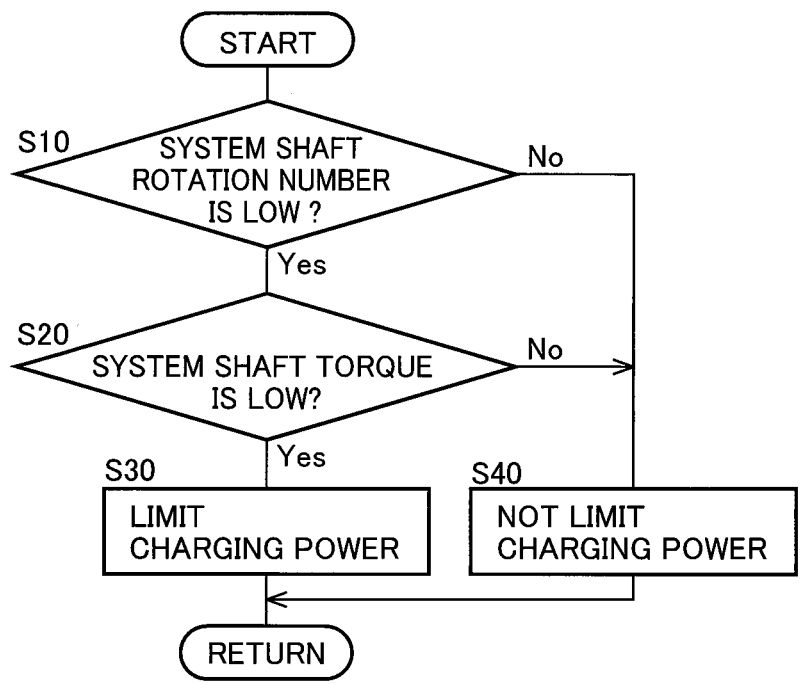
FIG. 4 is a flowchart explaining a principal part of control action of an electronic control device and is a flowchart explaining control action for properly keeping a remaining battery charge while suppressing occurrence of shock when performing charge control during running.

FIG. 4 is a flowchart explaining a principal part of control action of the electronic control unit 90 and is a flowchart e.g. repeatedly executed, explaining control action for properly keeping the remaining battery charge SOC while suppressing occurrence of shock when performing charge control $CT_{chg}$ during running.

In FIG. 4, steps of the flowchart correspond to functions of the charge limit control unit 96. At step S10 (hereinafter, the term "step" will be omitted), it is determined whether the system shaft rotation number $N_{sys}$ is equal to or less than the fixed rotation number $N_{sysf}$. If the determination at S10 is affirmative, it is determined at S20 whether the demanded system shaft torque $T_{sysdem}$ is equal to or less than the fixed torque $T_{sysf}$. If the determination at S20 is affirmative, the charge limit control $CT_{limchg}$ is performed at S30. For example, the upper-limit charging power $W_{chgul}$ is set so that the charging power $W_{chg}$ is limited to be equal to or less than the upper-limit charging power $W_{chgul}$ in spite of the demanded charging power $W_{chgdem}$. On the other hand, if the determination at S10 or S20 is negative, no charge limit control $CT_{limchg}$ is performed at S40. For example, the charging power $W_{chg}$ is not limited for the demanded charging power $W_{chgdem}$.

As described above, according to the embodiment, the charge limit control $CT_{limchg}$ is performed if the system shaft rotation number $N_{sys}$ is equal to or less than the fixed rotation number $N_{sysf}$ and if the system shaft torque $T_{sys}$ is equal to or less than the fixed torque $T_{sysf}$, whereas the charge limit control $CT_{limchg}$ is not performed if the system shaft rotation number $N_{sys}$ exceeds the fixed rotation number $N_{sysf}$ or if the system shaft torque $T_{sys}$ exceeds the fixed torque $T_{sysf}$, with the result that increase of the engine torque $T_e$ in response to the demanded charging power $W_{chgdem}$ is suppressed and influence of variations in the engine torque $T_e$ on the system shaft torque $T_{sys}$ is suppressed. Thus, at the time of performing the charge control $CT_{chg}$ during running, it is possible to properly keep the remaining battery charge SOC while suppressing occurrence of shock.

According to the embodiment, the charge limit control $CT_{limchg}$ is performed if the vehicle velocity V is equal to or less than the fixed vehicle velocity $V_f$, whereas the charge limit control $CT_{limchg}$ is not performed if the vehicle velocity V exceeds the fixed vehicle velocity $V_f$, with the result that occurrence of shock is suppressed due to execution of the charge limit control $CT_{limchg}$ in the low vehicle velocity range having high shock sensitivity.

According to the embodiment, in the case of performing the charge limit control $CT_{limchg}$, at least one of the fixed rotation number $N_{sysf}$ and the fixed torque $T_{sysf}$ is set to a higher value according as the vehicle velocity V is lower, facilitating execution of the charge limit control $CT_{limchg}$ according as going to lower vehicle velocity side having higher shock sensitivity.

According to the embodiment, in the case of performing the charge limit control $CT_{limchg}$ the upper-limit charging power $W_{chgul}$ is set to a smaller value according as the vehicle velocity V is lower, thereby more suppressing increase in the engine torque $T_e$ and influence of variations in the engine torque $T_e$ according as going to lower vehicle velocity side having higher shock sensitivity.

According to the embodiment, the charge limit control $CT_{limchg}$ is performed if the gear ratio $\gamma_{at}$ of the automatic transmission 24 is the fixed low-side gear ratio $\gamma_{atf}$ whereas the charge limit control $CT_{limchg}$ is not performed if the gear ratio $\gamma_{at}$ is on higher side than the fixed low-side gear ratio $\gamma_{atf}$, thereby suppressing occurrence of shock through execution of the charge limit control $CT_{limchg}$ at the low-side gear ratio having high shock sensitivity.

According to the embodiment, in the case of performing the charge limit control $CT_{limchg}$ at least one of the fixed rotation number $N_{sysf}$ and the fixed torque $T_{sysf}$ is set to a higher value according as the gear ratio $\gamma_{at}$ is on lower side, facilitating execution of the charge limit control $CT_{limchg}$ according as going to a lower-side gear ratio having higher shock sensitivity.

According to the embodiment, in the case of performing the charge limit control $CT_{limchg}$, the upper-limit charging power $W_{chgul}$ is set to a smaller value according as the gear ratio $\gamma_{at}$ of the automatic transmission 24 is on lower side, thereby more suppressing increase in the engine torque $T_e$ and influence of variations in the engine torque $T_e$ according as going to a lower-side gear ratio having higher shock sensitivity.

According to the embodiment, in the case of performing the charge limit control $CT_{limchg}$, the upper-limit charging power $W_{chgul}$ is set to a smaller value according as the system shaft rotation number $N_{sys}$ is lower, thereby more suppressing increase in the engine torque $T_e$ according as going to a lower system shaft rotation number $N_{sys}$ that allows easier increase in the engine torque $T_e$.

According to the embodiment, in the case of performing the charge limit control $CT_{limchg}$, the upper-limit charging power $W_{chgul}$ is set to a smaller value according as the system shaft torque $T_{sys}$ is lower, thereby more suppressing influence of variations in the engine torque $T_e$ according as going to a lower system shaft torque $T_{sys}$ that allows influence of variations in the engine torque $T_e$ more easily.

Although the embodiment of the present disclosure has hereinbefore been described in detail with reference to the drawings, the present disclosure is applicable to other modes as well.

Figure 5:
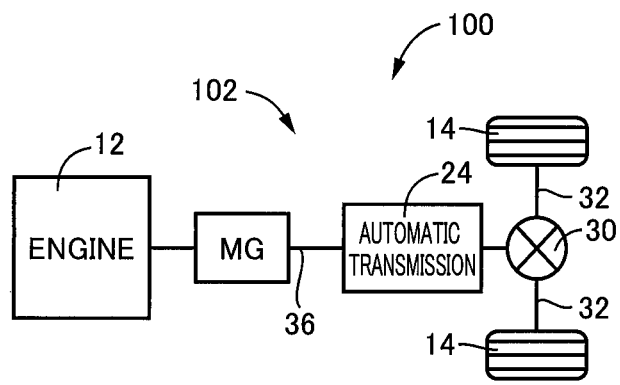
FIG. 5 is a diagram explaining a schematic configuration of a vehicle to which the present disclosure is applied and is a diagram showing an example of the vehicle different from the vehicle of FIG. 1.

For example, in the above embodiment, the present disclosure is applicable to a vehicle 100 not having the K0 clutch 20 as shown in FIG. 5, instead of the vehicle 10. In a power transmission device 102 included in the vehicle 100, the engine 12 is coupled to the electric motor coupling shaft 36 in a power transmittable manner without the K0 clutch 20 intervening therebetween.

Although in the above embodiment, the planetary gear type automatic transmission has been exemplified as the automatic transmission 24, this mode is not limitative. For example, the automatic transmission 24 may be a synchronous mesh type parallel twin-shaft automatic transmission including a publicly known dual clutch transmission (DCT), or a publicly known belt-type continuously variable transmission. The automatic transmission 24 need not necessarily be disposed. In such a case, no use is made of the upperlimit-value map as shown in FIG. 3 differing for each of the gear stages of the automatic transmission 24.

Although in the above embodiment, the torque converter 22 has been used as the hydrodynamic power transmission device, this mode is not limitative. For example, the hydrodynamic power transmission device may be another type of hydrodynamic power transmission device such as a fluid coupling not having the torque amplification function, in lieu of the torque converter 22. The hydrodynamic power transmission device need not necessarily be disposed, and may be replaced with a startup clutch for example. In short, the present disclosure is applicable to any vehicle as long as it has: a power source including an engine and an electric motor; and a power transmission shaft to which the power source is coupled in a power transmittable manner; and includes: a power transmission device transmitting a torque of the power source input to the power transmission shaft, to driving wheels; and an electric-power accumulator supplying/receiving electric power to/from the electric motor.

The above embodiment is a mere embodiment and the present disclosure can be carried out in any modes variously altered and modified based on the knowledge of those skilled in the art.

EXPLANATIONS OF LETTERS OR NUMERALS 10, 100: vehicle
12: engine
14: driving wheel
16, 102: power transmission device
24: automatic transmission
36: electric motor coupling shaft (power transmission shaft)
38: transmission input shaft (power transmission shaft)
54: battery (electric-power accumulator)
90: electronic control unit (control device)
92: power source control unit
96: charge limit control unit
MG: electric motor
SP: power source

The invention claimed is:

1. An electronic control unit of a vehicle, the vehicle having: a power source including an engine and an electric motor; and a power transmission shaft to which the power source is coupled in a power transmittable manner; the vehicle comprising: a transmission transmitting a torque of the power source input to the power transmission shaft, to driving wheels; and an electric-power accumulator supplying/receiving electric power to/from the electric motor, the electronic control unit configured to:
perform charge control for increasing a torque of the engine that achieves a drive demand amount so as to achieve a demanded value of a charging power to be charged into the electric-power accumulator by power generation of the electric motor during running of the vehicle in a driving state;
perform charge limit control for limiting the charging power in the charge control when the power transmission shaft has a rotation number equal to or less than a fixed rotation number and when a power transmission shaft torque is equal to or less than a fixed torque, the power transmission shaft torque being a torque on the power transmission shaft transmitted to the driving wheels, of the torque of the power source, the electronic control unit not performing the charge limit control when the power transmission shaft has a rotation number exceeding the fixed rotation number or when the power transmission shaft torque exceeds the fixed torque;
perform the charge limit control when the vehicle has a vehicle velocity equal to or less than a fixed vehicle velocity, and not perform the charge limit control when the vehicle velocity exceeds the fixed vehicle velocity,
wherein when the electronic control unit performs the charge limit control, the electronic control unit sets at least one of the fixed rotation number and the fixed torque to a higher value as the vehicle velocity is lower.

2. The control device of a vehicle of claim 1, wherein when the electronic control unit performs the charge limit control, the electronic control unit sets an upper limit value of the charging power upon limiting the charging power, to a smaller value as the vehicle velocity is lower.

3. The control device of a vehicle of claim 1, wherein the electronic control unit performs the charge limit control when an automatic transmission disposed in the transmission has a gear ratio equal to a predetermined low-vehicle-velocity-side gear ratio, the electronic control unit not performing the charge limit control when the gear ratio is on higher vehicle-velocity side than the predetermined low-vehicle-velocity-side gear ratio.

4. The control device of a vehicle of claim 3, wherein when the electronic control unit performs the charge limit control, the electronic control unit sets at least one of the fixed rotation number and the fixed torque to a higher value as the gear ratio is on lower vehicle-velocity side.

5. The control device of a vehicle of claim 3, wherein when the electronic control unit performs the charge limit control, the electronic control unit sets an upper limit value of the charging power upon limiting the charging power, to a smaller value as the gear ratio is on lower vehicle-velocity side.

6. The control device of a vehicle of claim 1, wherein when the electronic control unit performs the charge limit control, the electronic control unit sets an upper limit value of the charging power upon limiting the charging power, to a smaller value as the power transmission shaft has a lower rotation number.

7. The control device of a vehicle of claim 1, wherein when the electronic control unit performs the charge limit control, the electronic control unit sets an upper limit value of the charging power upon limiting the charging power, to a smaller value as the power transmission shaft torque is lower.

8. An electronic control unit of a vehicle, the vehicle having: a power source including an engine and an electric motor; and a power transmission shaft to which the power source is coupled in a power transmittable manner; the vehicle comprising: a transmission transmitting a torque of the power source input to the power transmission shaft, to driving wheels; and an electric-power accumulator supplying/receiving electric power to/from the electric motor, the electronic control unit configured to:
perform charge control for increasing a torque of the engine that achieves a drive demand amount so as to achieve a demanded value of a charging power to be charged into the electric-power accumulator by power generation of the electric motor during running of the vehicle in a driving state;
perform charge limit control for limiting the charging power in the charge control when the power transmission shaft has a rotation number equal to or less than a fixed rotation number and when a power transmission shaft torque is equal to or less than a fixed torque, the power transmission shaft torque being a torque on the power transmission shaft transmitted to the driving wheels, of the torque of the power source, the electronic control unit not performing the charge limit control when the power transmission shaft has a rotation number exceeding the fixed rotation number or when the power transmission shaft torque exceeds the fixed torque; and perform the charge limit control when an automatic transmission disposed in the transmission has a gear ratio equal to a predetermined low-vehicle-velocity-side gear ratio, and not perform the charge limit control when the gear ratio is on higher vehicle-velocity side than the predetermined low-vehicle-velocity-side gear ratio;

wherein when the electronic control unit performs the charge limit control, the electronic control unit sets at least one of the fixed rotation number and the fixed torque to a higher value as the gear ratio is on lower vehicle-velocity side.

\* \* \* \* \*